US008851138B2

(12) United States Patent
Maruo et al.

(10) Patent No.: US 8,851,138 B2
(45) Date of Patent: Oct. 7, 2014

(54) SUBSTRATE BACKING DEVICE AND SUBSTRATE THERMOCOMPRESSION-BONDING DEVICE

(75) Inventors: Hiroki Maruo, Osaka (JP); Koji Motomura, Osaka (JP); Hideki Eifuku, Osaka (JP); Tadahiko Sakai, Osaka (JP)

(73) Assignee: Panasonic Corporation, Osaka (JP)

( * ) Notice: Subject to any disclaimer, the term of this patent is extended or adjusted under 35 U.S.C. 154(b) by 236 days.

(21) Appl. No.: 13/504,591

(22) PCT Filed: Jul. 5, 2011

(86) PCT No.: PCT/JP2011/003830

§ 371 (c)(1),
(2), (4) Date: Apr. 27, 2012

(87) PCT Pub. No.: WO2012/032701

PCT Pub. Date: Mar. 15, 2012

(65) Prior Publication Data

US 2012/0234496 A1 Sep. 20, 2012

(30) Foreign Application Priority Data

Sep. 10, 2010 (JP) ................................ 2010-202578

(51) Int. Cl.

| | |
|---|---|
| ***B29C 65/20*** | (2006.01) |
| ***B32B 37/10*** | (2006.01) |
| ***B32B 38/18*** | (2006.01) |
| ***B32B 39/00*** | (2006.01) |
| ***B32B 43/00*** | (2006.01) |
| ***B30B 5/02*** | (2006.01) |
| ***B32B 5/04*** | (2006.01) |
| ***B30B 15/28*** | (2006.01) |
| ***B25B 11/00*** | (2006.01) |

(52) U.S. Cl.

CPC .................................. *B25B 11/005* (2013.01)
USPC ......................... 156/556; 156/561; 156/583.1

(58) Field of Classification Search

USPC ................ 156/381, 382, 538, 556, 566, 581, 156/583.1

See application file for complete search history.

(56) References Cited

U.S. PATENT DOCUMENTS 4,953,287 A * 9/1990 West et al. ........................ 29/611
5,855,637 A * 1/1999 Yakou et al. ................. 65/29.12
2009/0075025 A1 3/2009 Ozono et al.
2010/0251541 A1 10/2010 Saito

FOREIGN PATENT DOCUMENTS

| | | |
|---|---|---|
| JP | 2007-149815 | 6/2007 |
| JP | 2007-214559 | 8/2007 |
| JP | 2010-103139 | 5/2010 |
| JP | 2010-129682 | 6/2010 |
| TW | 200934331 | 8/2009 |
| WO | 2009/054191 | 4/2009 |

OTHER PUBLICATIONS

International Preliminary Report on Patentability issued Apr. 18, 2013 in corresponding PCT Application No. PCT/JP2011/003830.
International Search Report issued Aug. 9, 2011 in International (PCT) Application No. PCT/JP2011/003830.
Office Action issued May 6, 2014 in corresponding Chinese Application No. 201180004369.4, with English translation.

* cited by examiner

*Primary Examiner* — Sing P Chan
(74) *Attorney, Agent, or Firm* — Wenderoth, Lind & Ponack, L.L.P.

(57) ABSTRACT

A substrate backing device places and holds a rigid substrate thereon and receives, from therebelow, a pressing force during operations for thermocompressively bonding a flexible substrate thereto. The substrate backing device includes a plate-shaped backing plate provided with a backing support surface adapted to come into contact with the lower surface of the rigid substrate for supporting it. The backing support surface is provided with an opening portion having a planar opening shape encompassing the area of the rigid substrate to be compressively bonded to the flexible substrate. The backing support surface is provided, within the opening portion, a receiving member which, during the thermocompression bonding operations, come into contact with the lower surface of the rigid substrate and with an already-mounted component having been preliminarily mounted on this lower surface in the compression-bonding area and, further, apply an upward supporting counterforce corresponding to the pressing force.

10 Claims, 14 Drawing Sheets

SUBSTRATE BACKING DEVICE AND SUBSTRATE THERMOCOMPRESSION-BONDING DEVICE

TECHNICAL FIELD

The present invention relates to substrate backing devices, and substrate thermocompression-bonding devices employing such substrate backing devices. The present invention is particularly suitable for thermocompressively bonding a first substrate with flexibility such as a film-type flexible substrate to a second substrate with rigidity such as a rigid substrate.

BACKGROUND ART

Electronic apparatuses required to have reduced sizes and higher functionality, such as cellular phones, have generally employed structures in which individual functional modules, such as CCD cameras and display panels, are connected to a main electronic-circuit module provided on a rigid substrate with a film-type flexible substrate interposed therebetween. As methods for connecting a terminal provided on the flexible substrate to a circuit electrode provided on the rigid substrate, there have been known connection methods using a conductive adhesive agent formed from a thermosetting resin containing conductive particles such as a solder (refer to Patent Documents 1 and 2, for example). In these connection methods, the conductive adhesive agent is preliminarily provided on the circuit electrodes, and the flexible substrate is thermocompressively bonded to the rigid substrate with a thermocompression-bonding device. Through this thermocompression bonding, it is possible to establish electrical conduction between the circuit electrode and the terminal through the conductive particles sandwiched between the circuit electrode and the terminal. Further, through the thermosetting resin having been thermally cured during the thermocompression bonding, it is possible to bond the flexible substrate and the rigid substrate to each other.

PRIOR ART DOCUMENTS

Patent Document

[Patent Document 1] JP-A No. 2007-149815
[Patent Document 2] JP-A No. 2007-214559

DISCLOSURE OF THE INVENTION

Problems to be Solved by the Invention

Along with recent further progress of size reduction and high functionality in electronic apparatuses, there has been a tendency of electronic components to be mounted on substrates with higher densities. Therefore, rigid substrates have been required to function as higher-density mountable substrates. More specifically, at first, rigid substrates have been required to incorporate double-sided mounting which enables mounting components on both the front and rear surfaces thereof. Furthermore, such rigid substrates of double-sided mounting type have been required to enable mounting components even in an area which is coincident with the back side of a circuit electrode, on the opposite surface from the surface provided with the circuit electrode for connecting a flexible substrate thereto.

However, in realizing rigid substrates which function as higher-density mountable substrates, there have been problems as follows, in applying, thereto, connections to flexible substrates through thermocompression bonding using conductive adhesive agents as described above.

In cases where the conductive adhesive agent is formed from a thermosetting resin containing a solder as conductive particles, the solder is molten and also crushed through thermocompression bonding. In order to ensure high-level reliability of the connection between the rigid substrate and the flexible substrate, it is necessary to form a solder bonding portion with a preferable shape between the terminal and the circuit electrode. Therefore, during the thermocompression bonding, there is a need for controlling the compression-bonding load with higher accuracy, in order to cause the molten solder to spread over the bonding surfaces of the circuit electrode and the terminal, without excessively crushing the molten solder. In cases where the conductive particles in the conductive adhesive agent is made of a material other than a solder, similarly, there is a need for controlling the compression-bonding load with higher accuracy during the thermocompression bonding.

However, in order to realize high-accuracy control of the compression-bonding load during thermocompression bonding with a known thermocompression-bonding device, for coping with rigid substrates which function as higher-density mountable substrates, it is unavoidably necessary to significantly complicate the structure of the thermocompression-bonding device, thereby involving an increase of the equipment cost. Further, in order to control, with high accuracy, the compression-bonding load during thermocompression bonding with a known thermocompression-bonding device, there is a need for precise control of the pressing force, thereby making it difficult to ensure stabilized connection quality.

Therefore, it is an object of the present invention to provide a substrate backing device capable of ensuring stabilized connection quality, with a simple structure, without necessitating precise pressing-force control. Further, it is another object of the present invention to provide a substrate thermocompression-bonding device employing such a substrate backing device.

Means for Solving the Problems

A substrate backing device in a first aspect of the present invention is a substrate backing device for placing and holding a first substrate and for receiving, from therebelow, a pressing force during thermocompressively bonding a second substrate to the first substrate, the substrate backing device including: a base portion provided with a horizontal flat surface in its upper surface; and a backing plate which is adapted to be contacted, at its lower surface, with the flat surface of the base portion and, further, is provided, in its upper surface parallel with the lower surface, with a backing support surface adapted to come into contact with a lower surface of the first substrate for supporting it; wherein the backing support surface includes a holding flat-surface portion adapted to hold the lower surface of the first substrate placed on the backing plate, an opening portion which is shaped and positioned to encompass a compression bonding area of the first substrate placed thereon which is to be compressively bonded to the second substrate, and a height reference portion which is provided adjacent to the opening portion and is adapted to restrict the first substrate in terms of its heightwise position; wherein the packing support surface is provided with a receiving member which is placed within the opening portion and is adapted to, during the thermocompression bonding, come into contact with the lower surface of the first substrate and with a component having been preliminarily mounted on this lower surface in an area coincident with the compression bonding area and, further, apply an upward supporting counterforce corresponding to the pressing force.

More specifically, the receiving member includes a resilient member which is adapted to exert an upward resilient force, which is induced when being pushed downwardly by the lower surface of the first substrate and the component which are in contact with its upper surface, as a supporting counterforce on the first substrate and on the component. The resilient member preferably includes a plurality of blocks which are defined by a cutout extending from its upper surface and can be pushed individually.

A substrate thermocompression-bonding device in a second aspect of the present invention is a substrate thermocompression-bonding device for pressing a second substrate to a first substrate for thermocompressively bonding them, the substrate thermocompression-bonding device including: the aforementioned substrate backing device; a work transfer mechanism adapted to hold the second substrate and transfer it to the first substrate being held by the substrate backing device; a compression bonding portion adapted to press the transferred second substrate against the first substrate for thermocompressively bonding them; and a relative movement mechanism adapted to move the compression bonding portion with respect to the substrate backing portion.

Effects of the Invention

With the substrate backing device and the substrate thermocompression-bonding device according to the present invention, the receiving member is placed within the opening portion provided in the backing support surface of the backing plate. When the second substrate is theremocompressively bonded to the first substrate, in the compression-bonding area of the first substrate to which the second substrate is to be compressively bonded, the lower surface of the first substrate and the component having been preliminarily mounted on the lower surface of the first substrate are supported by the supporting counterforce applied thereto from the receiving member. More specifically, the receiving member includes the resilient member which exerts a resilient force, which is induced when being pushed by the lower surface of the first substrate and the component thereon, as a supporting counterforce thereon. With the simple structure employing the receiving member placed within the opening portion, it is possible to apply an appropriate supporting counterforce to the first substrate during thermocompression bonding. Accordingly, it is possible to ensure stabilized connection quality with a lower equipment cost, without necessitating precise pressing-force control.

Particularly, by providing the blocks defined by the cutout in the resilient member included in the receiving member, it is possible to improve the followability of the resilient member to the convexity and concavity formed by the lower surface of the first substrate and the component mounted on this lower surface in the compression bonding area, when it is pressed thereagainst to be deformed. As a result thereof, it is possible to improve the uniformity of the supporting counterforce which acts on the lower surface of the first substrate and the component thereon, thereby improving the properness thereof.

BEST MODE FOR CARRYING OUT THE INVENTION

Figure 1:
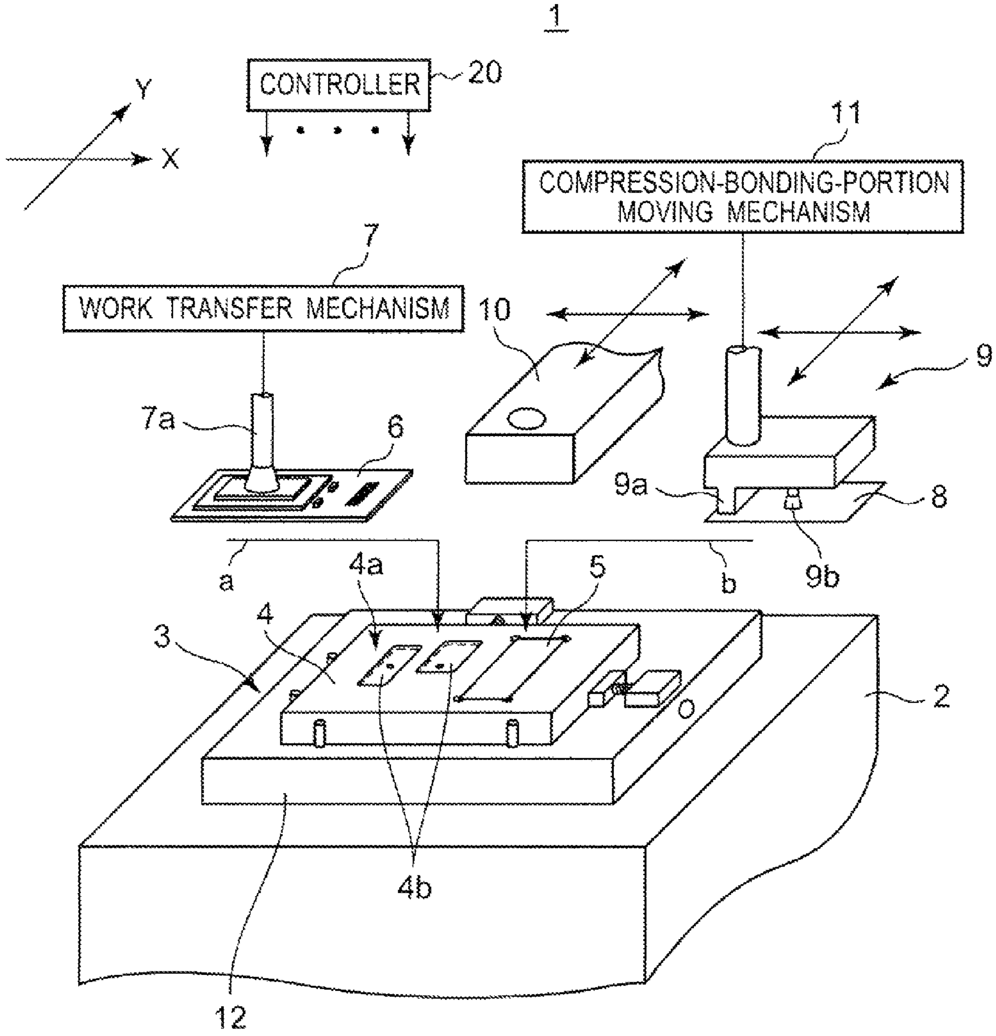
FIG. 1 is a perspective view of a substrate thermocompression-bonding device employing a substrate backing device according to a first embodiment of the present invention.

Next, embodiments of the present invention will be described, with reference to the drawings.

First Embodiment

At first, with reference to FIG. 1, structures and functions of a substrate thermocompression-bonding device 1 including a substrate backing device 3 according to a first embodiment of the present invention will be described. The substrate thermocompression-bonding device 1 has the function of pressing a flexible substrate 8 as a second substrate having a flexibility, against aside edge portion of a rigid substrate 6 as a first substrate having rigidity, to thermocompressively bond them to each other. The thermocompression-bonding device 1 according to the present embodiment includes a work transfer device 7, a compression-bonding portion 9, an imaging unit 10, and a compression-bonding portion moving mechanism 11, in addition to the substrate backing device 3. Further, the thermocompression-bonding device 1 includes a controller 20 for controlling operations of the entire device including the substrate backing device 3, the work transfer device 6, the imaging unit 10, and the compression-bonding portion moving mechanism 11.

Figure 6A:
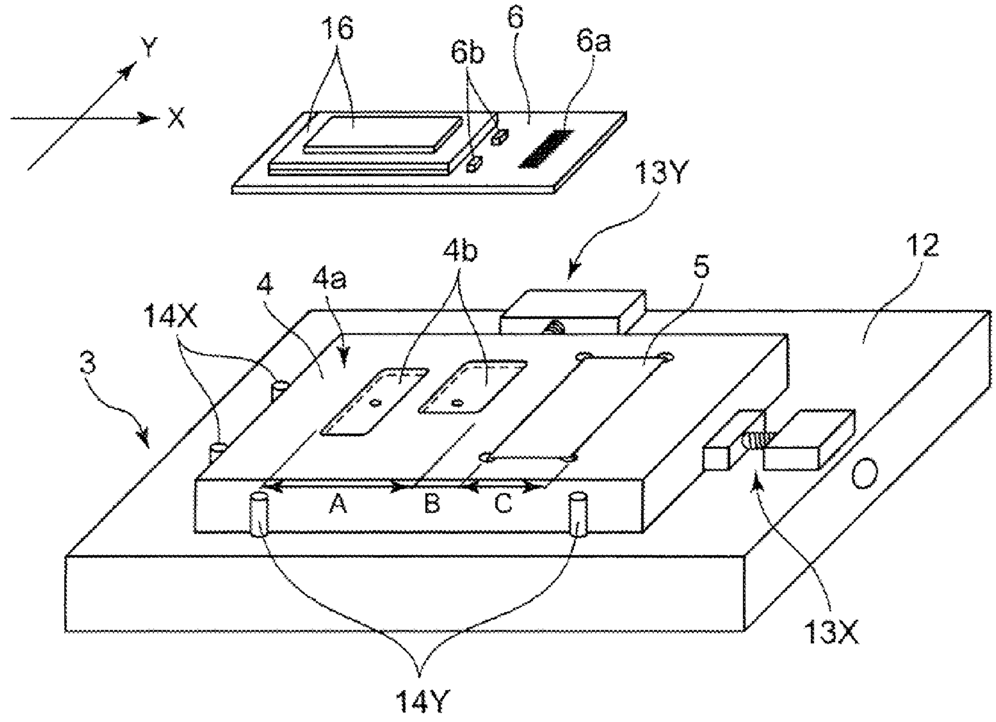
FIG. 6A is a perspective view illustrating an operation for placing a rigid substrate on the substrate backing device.
Figure 7A:
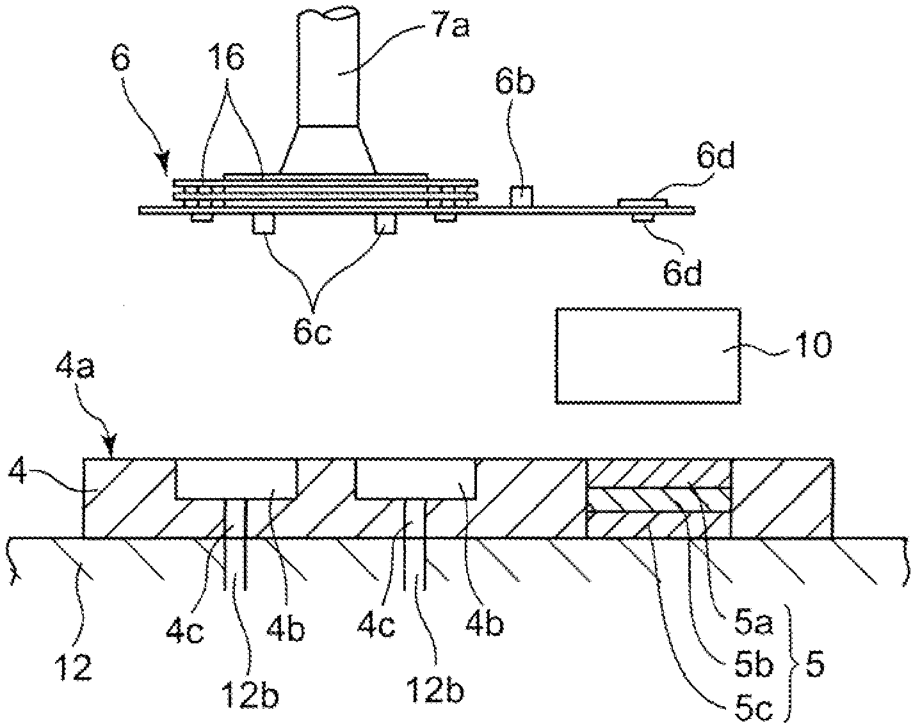
FIG. 7A is a cross-sectional view illustrating the operation for placing the rigid substrate on the substrate backing device.
Figure 7B:
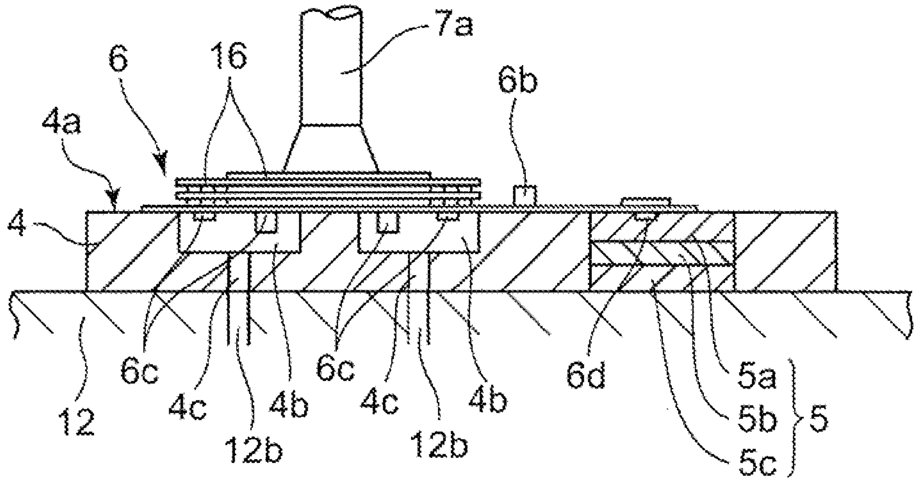
FIG. 7B is a cross-sectional view illustrating the operation for placing the rigid substrate on the substrate backing device.

Referring to both FIG. 6A and FIG. 7B, in the present embodiment, the rigid substrate 6 includes a connection terminal portion 6*a*, as a portion which functions as a circuit electrode for connecting the flexible substrate 1 thereto through compression bonding, near one end of the upper surface thereof, in the figure. More specifically, the connection terminal portion 6*a* of the rigid substrate 6 and the flexible substrate 8 are connected to each other, through thermocompression bonding, via a conductive adhesive agent containing a conductive agent, such as a solder powder. Further, on the upper surface of the rigid substrate 6, chip components 6*b* and laminated mounted components 16 have been preliminarily mounted at a previous process. On the lower surface of the rigid substrate 6, similarly, chip components 6*c* and 6*d* have been preliminarily mounted at a previous process. The chip components 6*c* are positioned in the side opposite from the laminated mounting components 16 and are spaced apart from the connection terminal portion 6*a*. On the other hand, the chip component 6*d* is positioned in the side opposite from the connection terminal portion 6*a*.

Referring to FIG. 1, the substrate backing device 3 is placed on the upper surface of a base table 2. A backing plate 4 is placed on the upper surface of a base portion 12 included in the substrate backing device 3. The backing plate 4 is provided with a receiving member 5 and a backing support surface 4*a* for holding the rigid substrate 6 through suction. With this structure, the rigid substrate 6 is placed on the upper surface of the backing plate 4 and is held through suction by concave portions 4*b* provided in the backing support surface 4*a* and, also, the receiving member 5 receives, from therebelow, pressing forces induced during thermocompression-bonding operations for thermocompressively bonding the flexible substrate 8 thereto.

The rigid substrate 6 is held through suction by a suction pad 7*a* provided in the work transfer mechanism 7. By driving the work transfer mechanism 7, the rigid substrate 6 is placed on the backing plate 4 in the substrate backing device 3 and, further, is held through suction thereon (an arrow a). The flexible substrate 8 to be thermocompressively bonded to the rigid substrate 6 is held by an auxiliary nozzle 9*b* and by a suction function of a compression-bonding tool 9*a* provided in the compression bonding portion 9. By driving the compression-bonding-portion moving mechanism 11, the flexible substrate 8 is positioned above the connection terminal portion 6*a* of the rigid substrate 6. The compression-bonding-portion moving mechanism 11 forms a relative movement mechanism for moving the compression bonding portion 9 with respect to the substrate backing device 3.

The imaging unit 10 is capable of bidirectional recognition in upward and downward directions for capturing images of both the flexible substrate 8 and the connection terminal portion 6*a* in the rigid substrate 6 for recognizing them. The controller 20 causes the imaging unit 10 to proceed to a position between the rigid substrate 6 placed on the backing plate 4 and the flexible substrate 8 positioned thereabove by being held through suction by the compression bonding portion 9. Further, the imaging unit 10 captures images of them, in order to detect the state of positional deviation between the connection terminal portion 6*a* and the flexible substrate 8. Further, in thermocompression-bonding operations for descending the compression bonding portion 9 to press the flexible substrate 8 against the rigid substrate 6 through the compression bonding tool 9*a* (an arrow b), based on the result of the positional-deviation detection having been detected by the imaging unit 10, the compression bonding portion 9 is corrected by the compression-bonding-portion moving mechanism 11, for positioning the flexible substrate 8 with respect to the connection terminal portion 6*a*.

Figure 2:
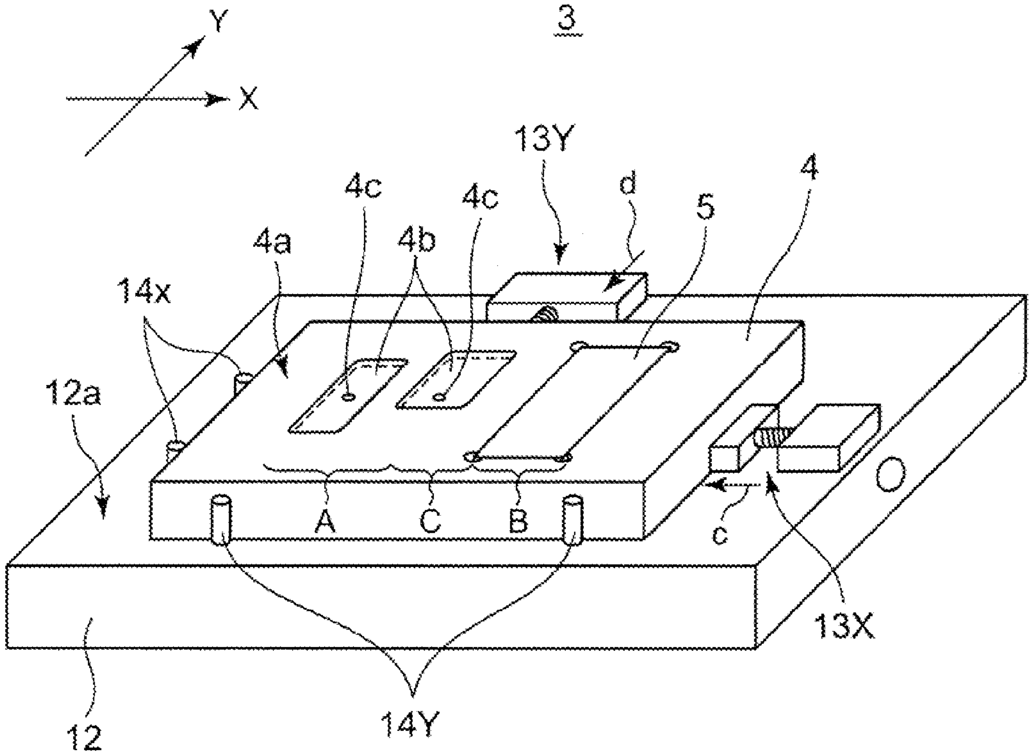
FIG. 2 is a perspective view of the substrate backing device according to the first embodiment of the present invention.
Figure 3:
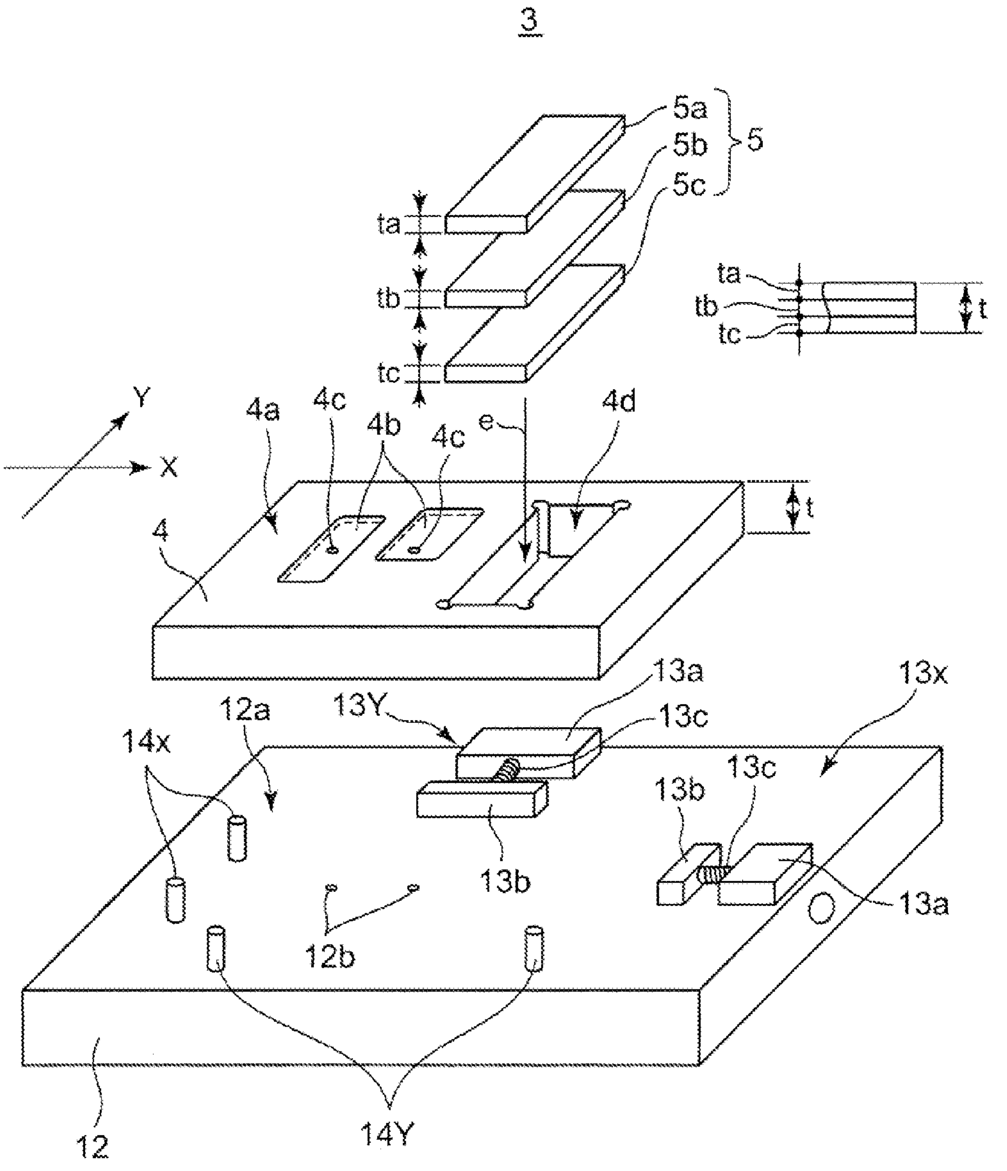
FIG. 3 is an exploded perspective view of the substrate backing device according to the first embodiment of the present invention.

Next, with reference to FIGS. 2 to 4B, the structure and functions of the substrate backing device 3 will be described. In thermocompression bonding for pressing the flexible substrate 8 through the compression bonding portion 9 against the connection terminal portion 6*a* provided at a side edge portion of the rigid substrate 6 with the substrate thermocompression-bonding device 1, the substrate backing device 3 has the function of placing and holding the rigid substrate 6 and, further, receiving, from therebelow, pressing forces induced during thermocompression-bonding operations. Further, FIG. 3 illustrates the components in FIG. 2 in an exploded state. Referring to FIG. 2 and FIG. 3, the base portion 12 is a rectangular-shaped plate member which is provided with a flat surface 12*a* in its upper surface. The backing plate 4 with a plate shape is in contact with the flat surface 12*a*, at its lower surface. In the present embodiment, the backing plate 4 has a plate shape having a constant thickness over its entirety, and the backing plate 4 is provided, in its upper surface provided in parallel with the lower surface thereof, with the backing support surface 4*a* which comes into contact with the lower surface of the rigid substrate 6 for supporting it.

As illustrated in FIG. 2 and FIG. 3, on the flat surface 12*a* of the base portion 12, there are planted positioning pins 14X and 14Y for positioning the backing plate 4, in the X direction and in the Y direction. Further, at positions faced to the positioning pins 14X and 14Y, there are provided clamping mechanisms 13X and 13Y. The clamping mechanisms 13X and 13Y are each structured to include a fixed block 13*a* and a piece-shaped contact block 13*b* protruded from the fixed block 13*a* with a spring pin 13*c* interposed therebetween. When the backing plate 4 is mounted on the base portion 12, the contact blocks 13*b* are brought into contact with side surfaces of the backing plate 4, in a state where the backing plate 4 is pressed, at two side surfaces thereof, against the positioning pins 14X and 14Y (arrows c and d). Thus, as illustrated in FIG. 4A, the backing plate 4 is clamped by elastic pressing forces from the spring pins 13*c* in the clamping mechanisms 13X and 13Y, thereby fixing the position of the backing plate 4 on the base portion 12.

Figure 4A:
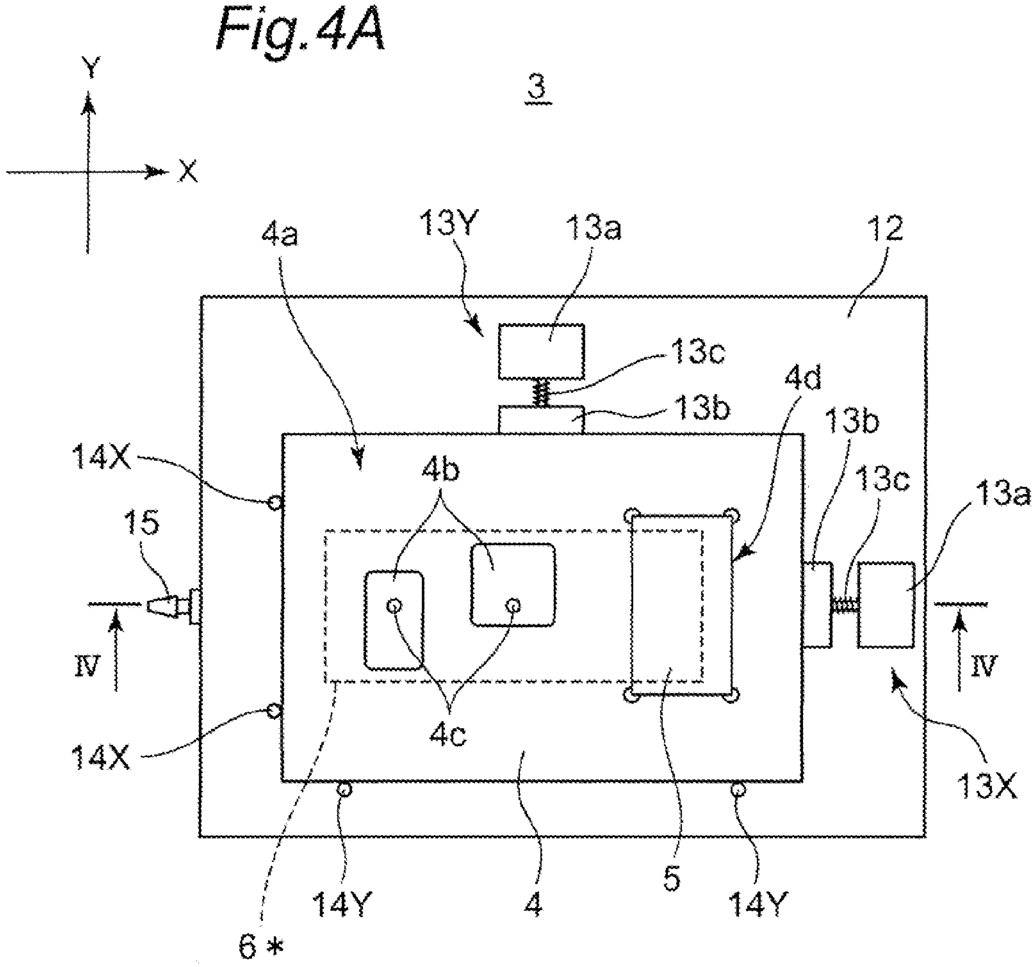
FIG. 4A is a plan view of the substrate backing device according to the first embodiment of the present invention.

By descending the rigid substrate 6 being held by the work transfer mechanism 7, with respect to the backing plate 4 being held by the positioning pins 14X and 14Y and the clamping mechanisms 13X and 13Y, the rigid substrate 6 is held at a planer-shaped position at which the rigid substrate 6 should be placed, which is illustrated by a broken-line frame in FIG. 4A.

Further, in the flat surface 12*a* of the base portion 12, there are formed suction holes 12*b* at positions which communicate with suction holes 4*c* in the backing plate 4, which will be described later.

Figure 4B:
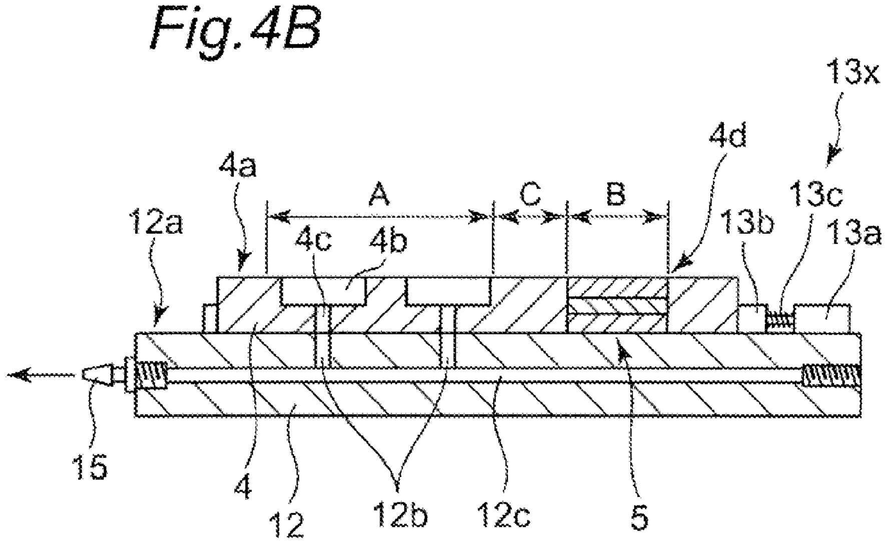
FIG. 4B is a cross-sectional view taken along the line IV-IV in FIG. 4A.

Referring to FIG. 4B, the backing support surface 4*a* in the upper surface of the backing plate 4 can be partitioned into plural portions according to their functions when the rigid substrate 6 is placed on the backing plate 4 and is received thereby from therebelow. At first, a holding flat-surface portion A has the function of holding, in a surface-to-surface manner, the lower surface of the rigid substrate 6 being placed on the backing plate 4. The holding flat-surface portion A is provided with releasing concave portions 4*b* for preventing interference with the chip components 6*c* having been already mounted on the lower surface of the rigid substrate 6. The positions, the shapes and the sizes of the concave portions 4*b* are determined according to the placement of the chip components 6*c* on the rigid substrate 6 to be subjected to works. By placing and housing the already-mounted chip components 6*c* within the concave portions 4*b*, it is possible to bring the lower surface of the rigid substrate 6 into close contact with the backing support surface 4*a*.

Further, the suction holes 4*c* are formed in the bottom surfaces of the concave portions 4*b*. In a state where the backing plate 4 is mounted on the base portion 12, the suction holes 4*c* communicate with the suction holes 12*b* formed in the flat surface 12*a*, as illustrated in FIG. 4B. The suction holes 12*b* communicate with a suction hole 12*c* provided horizontally inside the base portion 12. The suction hole 12*c* is connected to a vacuum suction source (not illustrated) through a pneumatic pipe terminal 15. In the state where the rigid substrate 6 is placed on the backing support surface 4*a*, by evacuating the inside of the concave portions 4*b* through the suction holes 12*c*, the rigid substrate 6 is held, through vacuum suction of its lower surface on the holding flat-surface portion A of the backing support surface 4*a*.

On the backing support surface 4*a*, in a compression-bonding flat-surface portion B encompassing a position corresponding to the connection terminal portion 6*a*, which is a position where the rigid substrate 6 placed thereon is to be compressively bonded, there is provided an opening portion 4*d*. The position, shape and size of the opening portion 4*d* are determined, such that it encompasses the area of the rigid substrate 6 which is to be connected to the flexible substrate 8 through thermocompression bonding, namely the compression-bonding area encompassing the connection terminal portion 6*a*. In the present embodiment, the position, shape and size of the opening portion 4*a* in a planar view are determined, such that it has a rectangular shape encompassing the compression-bonding area including the connection terminal portion 6*a*.

Between the holding flat-surface portion A and the compression-bonding flat-surface portion B, namely near the holding flat-surface portion A, there is formed a height reference portion C for restricting the heightwise position of the rigid substrate 6 which is placed on and contacted with the backing support surface 4*a*. Namely, the rigid substrate 6 placed thereon comes into close contact, at its lower surface, with the height reference portion C, so that the rigid substrate 6 is maintained at a proper heightwise position, during operations for thermocompressively bonding it to the flexible substrate 8.

The receiving member 5 is housed or mounted within the opening portion 4*d* provided in the backing support surface 4*a* (the compression-bonding flat-surface portion B) of the backing plate 4. The receiving member 5 has a function of applying an upward supporting counterforce corresponding to the pressing force by contacting both a portion which is positioned on the back side of the compression-bonding area encompassing the connection terminal portion 6*a*, out of the lower surface of the rigid substrate 6, during thermocompression bonding operations and the chip component 6*d* having been preliminarily mounted on this portion. The supporting property required for the rigid substrate 6 which is to be thermocompressively bonded is varied depending on every combination of the rigid substrate 6 and the flexible substrate 8 to be thermocompressively bonded to each other. Therefore, in the present embodiment, the receiving member 5 can be arbitrarily replaced, according to the types of the substrates to be thermocompressively-bonded to each other.

As illustrated in FIG. 3, in the present embodiment, the receiving member 5 includes two plate-shaped resilient members 5*a* and 5*b* having respective thicknesses of to and tb, and a single plate-shaped thickness adjustment member 5*c* having a thickness of tc. Namely, the receiving member 5 includes the resilient members 5*a* and 5*b* and the thickness adjustment member 5*c*. The resilient member 5*a* and 5*b* exert an upward resilient force, which is induced when being pushed downwardly by both the lower surface of the rigid substrate 6 contacting with the upper surface of the receiving member 5 and the chip component 6*c* having been already mounted thereon, as a supporting counterforce, on the rigid substrate 6 and the chip component 6*c*. The thickness adjustment member 5*c* is placed on the lower surface of the resilient member 5*b* for adjusting the thickness of the entire receiving member 5.

The two resilient members 5*a* and 5*b* and the single thickness adjustment member 5*c* are mounted within the opening portion 4*d*, in a state where they are laminated and integrated with each other (an arrow e). The resilient members 5*a* and 5*b* are made of a material having properties of being freely expanded and contracted by external forces, generating certain resilient forces according to the degree of their compression and, further, returning to the original shapes when removing external forces therefrom, such as elastomers such as resins or rubbers, sponges, felts. Further, the resilient members 5*a* and 5*b* can be formed from either laminated members made of the same material or a combination of members made of different materials. In the case of employing the same material thereas, the resilient members 5*a* and 5*b* can be formed to be an integrated plate-shaped member. Further, the respective thicknesses to and tb of the resilient members 5*a* and 5*b* can be equal to each other or different from each other, as required for providing a desired combination of properties, such as pressing forces therefrom, allowances for expansion and contraction thereof, and resilient forces therefrom.

The thickness adjustment member 5*c* is a plate-shaped member having a rectangular-plate shape with a thickness of tc which is made of metal, rigid resin, ceramic or other materials, wherein tc is determined such that the total thickness (ta+tb+tc) of the resilient members 5*a* and 5*b* and the thickness adjustment member 5*c* is coincident with the thickness t of the backing plate 4. In other words, the upper surface of the receiving member 5 (the upper surface of the resilient member 5*a* in the upper layer) which is housed in the opening portion 4*d* of the backing plate 4 and the compression-bonding flat-surface portion B of the backing support surface 4*a* of the backing plate 4 are positioned at the same height.

Figure 5A:
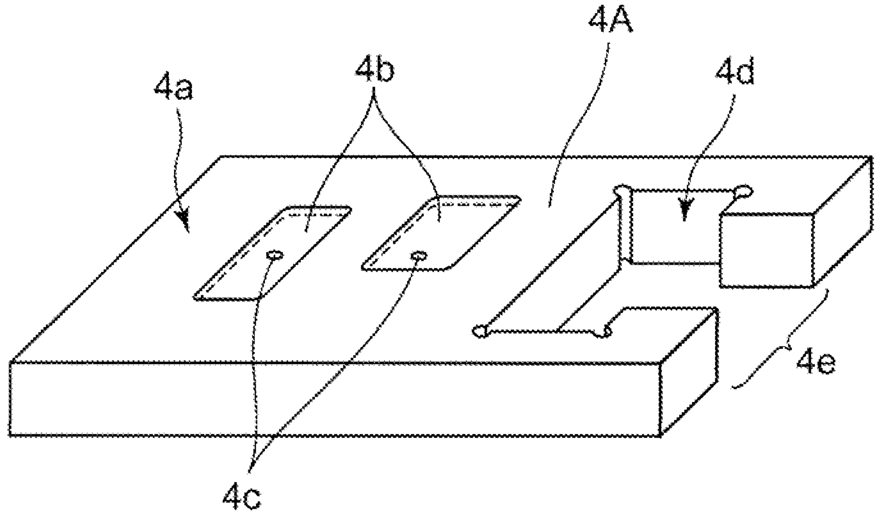
FIG. 5A is a perspective view illustrating a first alternative suggestion of the backing plate.
Figure 5B:
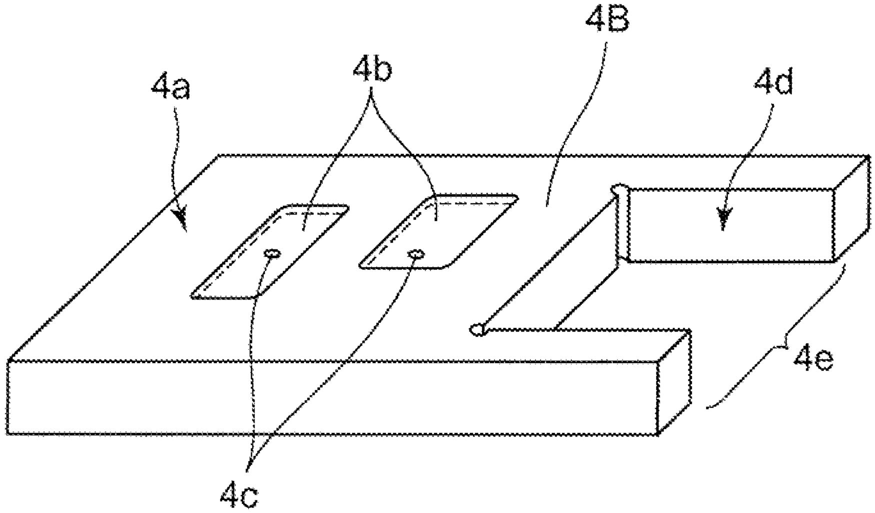
FIG. 5B is a perspective view illustrating a second alternative suggestion of the backing plate.

In the present embodiment, the opening portion 4*d* for mounting the receiving member 5, which is provided in the backing plate 4, has a rectangular shape which substantially conforms to the shape of the receiving member 5 in a planar view. Namely, in the present embodiment, the opening portion 4 has a completely-closed shape in a planar view. However, the opening portion 4*d* is not necessarily required to have such a completely-closed shape, provided that its shape is capable of restricting the position of the receiving member 5 in the horizontal direction. The opening portion 4*d* can be also shaped as illustrated in FIGS. 5 and 5B. At first, in the example illustrated in FIG. 5A, there is formed a cutout 4*e* with a smaller width (a size in the depthwise direction in the figure) than that of the opening portion 4*d*, such that it penetrates the right side wall of the backing plate 4, in the figure, from the opening portion 4*d*. Further, in the example illustrated in FIG. 5B, there is formed a cutout 4*e* with the same width as that of the opening portion 4*d*, such that it penetrates the right side wall of the backing plate 4, in the figure, from the opening portion 4*d*. By providing such a cutout 4*e* for opening the opening portion 4*d* in the horizontal direction, it is possible to improve the operability of the receiving member 5 in replacement thereof.

Next, with reference to FIG. 6A to FIG. 8B, thermocompression-bonding operations for thermocompressively bonding the flexible substrate 8 to the rigid substrate 6, with the substrate thermocompression-bonding device 1 using the substrate backing device 3 will be described.

At first, FIG. 6A to FIG. 7B illustrate operations for placing and holding the rigid substrate 6 on the substrate backing device 3. As described above, the connection terminal portion 6*a* is provided on the upper surface of the rigid substrate 6 and, further, the chip components 6*b* and the laminated mounted components 16 are mounted thereon. Further, the chip components 6*c* and 6*d* are mounted on the lower surface of the rigid substrate 6.

Figure 8A:
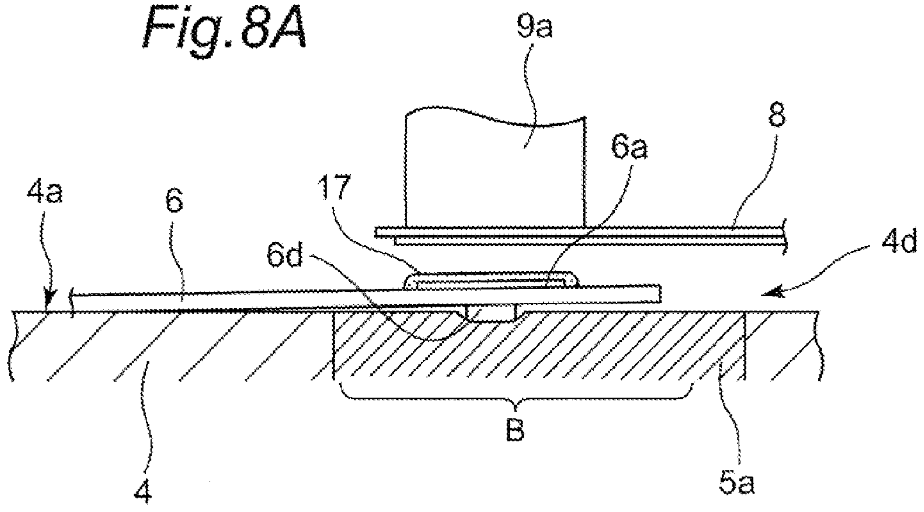
FIG. 8A is an enlarged cross-sectional view illustrating an operation of a receiving member during thermocompression bonding.
Figure 8B:
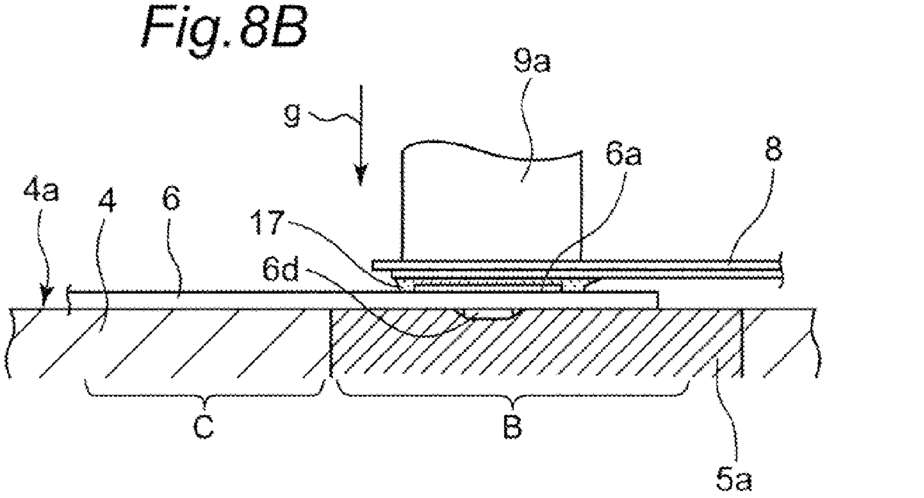
FIG. 8B is an enlarged cross-sectional view illustrating an operation of the receiving member during thermocompression bonding.

As illustrated in FIG. 8A and FIG. 8B, at a side edge portion of the rigid substrate 6, a conductive adhesive agent 17 has been preliminarily applied thereto, such that it is overlaid on the upper surface of the connection terminal portion 6*a*. The conductive adhesive agent 17 is formed from a thermosetting resin containing conductive particles such as solder particles. Since a pressing force and a temperature act on the conductive adhesive agent 17, from thereabove, during thermocompressiong-bonding processing, the conductive adhesive agent 17 establishes electric conduction between the connection terminal portion 6*a* and a connection terminal (not illustrated) formed on the lower surface of the flexible substrate 8 and, furthermore, bonds the lower surface of the flexible substrate 8 and the upper surface of the rigid substrate 6 to each other.

At first, as illustrated in FIG. 6A, the backing plate 4 is mounted to the base portion 12, and the backing plate 4 is pressed, at side end surfaces thereof, against the positioning pins 14X and 14Y through the clamping mechanisms 13X and 13Y, to clamp the backing plate 4, thereby attaining positioning of the backing plate 4. Further, in FIG. 6A and FIG. 6B, there is not illustrated the work transfer mechanism 7 for holding and transferring the rigid substrate 6.

Figure 6B:
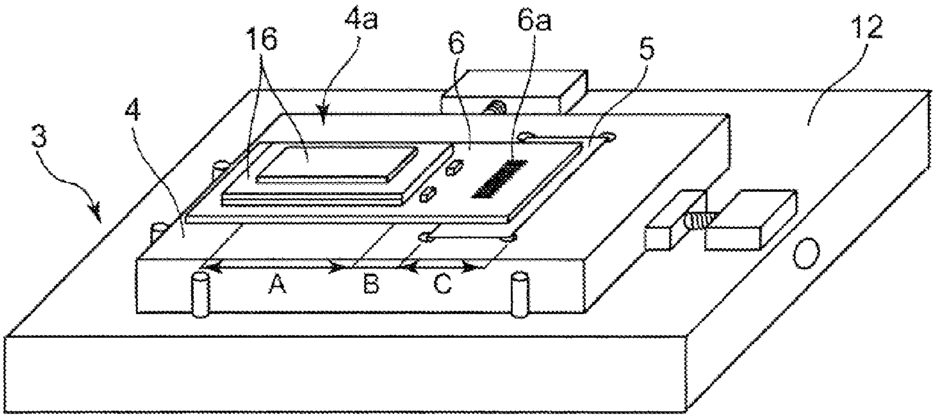
FIG. 6B is a perspective view illustrating the operation for placing the rigid substrate on the substrate backing device.

Next, as illustrated in FIG. 7A, the imaging unit 10 is caused to proceed to a position between the backing plate 4 and the rigid substrate 6 being held by the work transfer mechanism 7 and, then, is caused to capture images of them. Based on the result of image capturing, the rigid substrate 6 is descended with respect to the backing plate 4, as illustrated in FIG. 6B and FIG. 7B, while the rigid substrate 6 is positioned with respect to the backing plate 4, with the work transfer mechanism 7. The rigid substrate 6 is held by the backing support surface 4*a*. At this time, the rigid substrate 6 is held, at its lower surface, through suction by the holding flat-surface portion A and, further, the compression-bonding area encompassing the connection terminal portion 6*a* is positioned on the compression-bonding flat-surface portion B, thereby completing the preparation for applying, thereto, a supporting counterforce corresponding to the pressing force induced during thermocompression-bonding operations. At this time, as illustrated in FIG. 8A, the chip component 6*d* protruded downwardly from the lower surface of the rigid substrate 6 at a position coincident with the back side of the connection terminal portion 6*a* comes into contact with the upper surface of the receiving member 5 and, thus, the rigid substrate 6 is floated to some degree from the backing support surface 4*a* within the range of the compression-bonding flat-surface portion B. Further, this floating state is cancelled by pressing the rigid substrate 6 at its upper surface during thermocompressiong-bonding operations, which brings the lower surface of the rigid substrate 6 into close contact with the height reference portion C, thereby maintaining the rigid substrate 6 at a proper heightwise position.

Figure 7C:
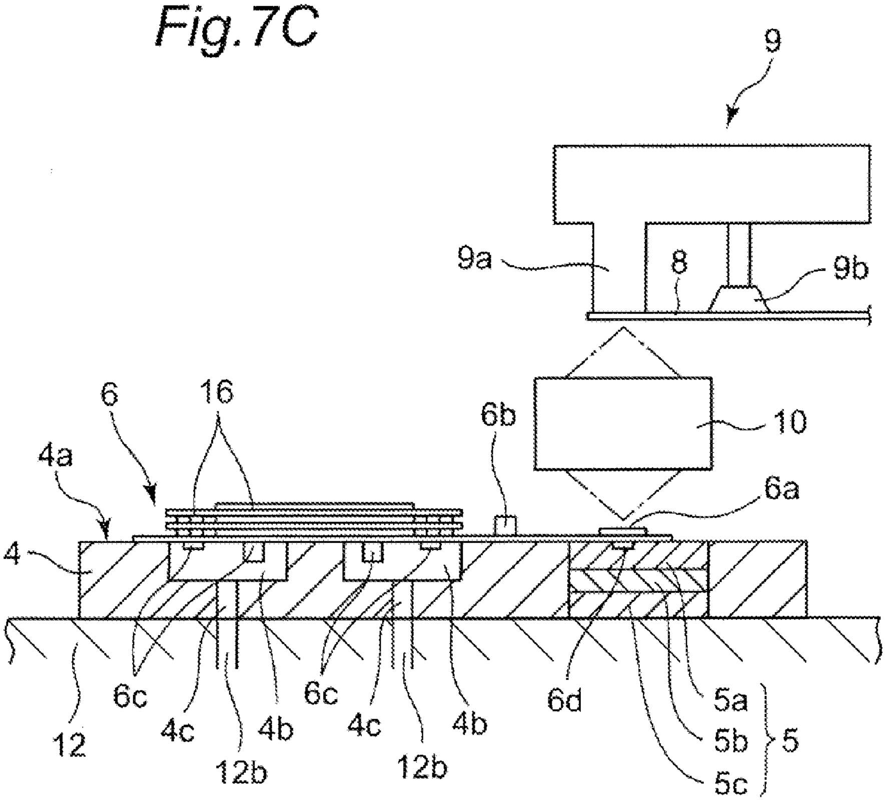
FIG. 7C is a cross-sectional view illustrating an operation for moving a flexible substrate.

Next, as illustrated in FIG. 7C, the compression bonding portion 9 holding the flexible substrate 8 through suction with the compression bonding tool 9*a* and the auxiliary nozzle 9*b* is moved by the compression-bonding-portion moving mechanism 11, for positioning the portion to be compressively bonded of the flexible substrate 8 above the connection terminal portion 6*a* of the rigid substrate 6. Further, in this state, the imaging unit 10 is caused to proceed to a position between the rigid substrate 6 and the flexible substrate 8 and, further, is caused to capture images of the rigid substrate 6 and the flexible substrate 8 for recognizing the positions of them. Thus, the positional deviation of the portion to be compressively bonded is detected.

Figure 7D:
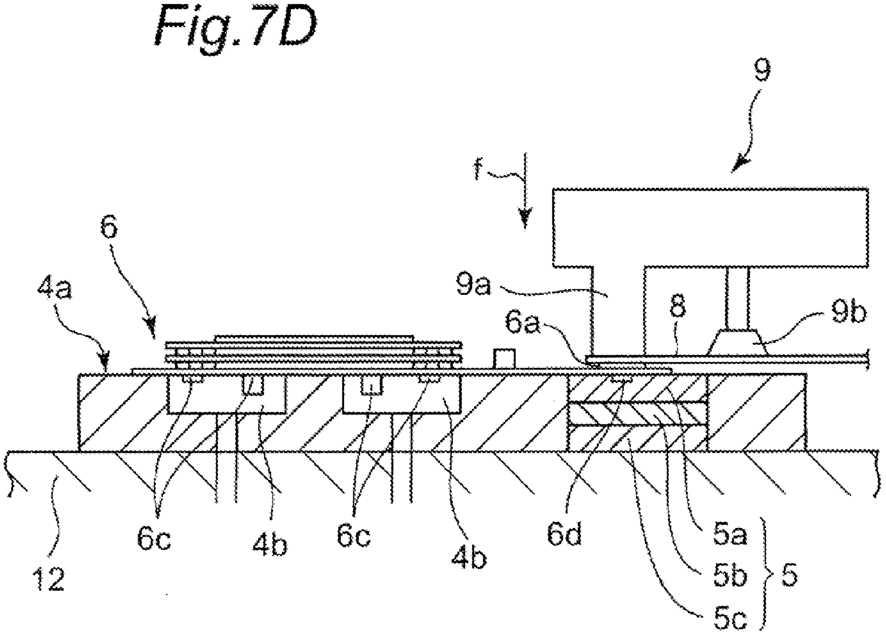
FIG. 7D is a cross-sectional view illustrating thermocompression bonding.

As illustrated in FIG. 7D, the compression bonding portion 9 is descended while the positional deviation is corrected (an arrow f), which causes the portion to be thermocompressively bonded of the flexible substrate 8 being held on the lower surface of the compression bonding tool 9*a* to be pressed against the connection terminal portion 6*a* of the rigid substrate 6, thereby causing them to be pressed against each other with a predetermined pressing force. At this time, the lower surface of the rigid substrate 6 (the portion coincident with the back side of the connection terminal portion 6*a* and portions therearound) and, also, the chip component 6*d* existing on the lower surface of the rigid substrate 6 are brought into contact with and pressed against the resilient member 5*a* in the uppermost layer of the receiving member 5.

FIG. 8A and FIG. 8B illustrate the mechanism for generating a supporting counterforce to be applied to the lower surface of the rigid substrate 6 and the chip component 6*d* thereon, from the resilient member 5*a* in the receiving member 5 during the thermocompression bonding processing. Namely, as illustrated in FIG. 8A, in a state where the rigid substrate 6 is merely placed on the backing support surface 4*a* and, therefore, is subjected to no pressing force from thereabove, the lower surface of the rigid substrate 6 is not entirely in contact with the resilient member 5*a* in the compression bonding flat-surface portion B, and only the chip component 6*d* protruding downwardly from the lower surface of the rigid substrate 6 is in contact with the resilient member 5*a*. Further, the rigid substrate 6 is held through suction on the holding flat-surface portion A to induce a force, which pushes, downwardly, the surface of the resilient member 5*a* through the aforementioned contacting portion, thereby partially sinking the upper surface of the resilient member 5*a*.

Next, as illustrated in FIG. 8B, the compression bonding portion 9 is descended from this state (an arrow g) to push, downwardly, the flexible substrate 8 through the compression bonding tool 9*a*, which brings the terminal (not illustrated) formed on the lower surface of the flexible substrate 8 into contact with the connection terminal portion 6*a* with the conductive adhesive agent 17 interposed therebetween and, further, pushes the rigid substrate 6 downwardly. This causes the rigid substrate 6 to be entirely pushed against the backing support surface 4*a*, which brings the rigid substrate 6 into close contact, at its lower surface, with the height reference portion C, thereby stopping the descending of the rigid substrate 6. Thus, the height thereof is restricted. Further, in this state, in the compression bonding flat-surface portion B, the rigid substrate 6 is in close contact, at its lower surface, with the upper surface of the resilient member 5*a* and, also, the chip component 6*d* having been already mounted thereon is sunk within the resilient member 5*a* with a sinking allowance corresponding to the height of this chip component 6*d* (the distance from the lower surface of the rigid substrate 6 to the lower end of the chip component 6*d* in FIG. 8A).

In this case, by properly determining the combination of the materials and the thickwise sizes of the resilient member 5*a* and the resilient member 5*b* in the receiving member 5, it is possible to generate an appropriate supporting counterforce for preferably bonding the connection terminal portion 6*a* and the flexible substrate 8 to each other with the conductive particles interposed therebetween, during operations for thermocompressively bonding the rigid substrate 6 and the flexible substrate 8 which are to be thermocompressively bonded to each other. The combination of the materials and the thickwise sizes of the resilient members 5*a* and 5*b* can be determined, by performing actual thermocompression bonding under plural test conditions using systematically-varied parameters about these combinations and, further, analyzing the results of these tests.

Figure 9A:
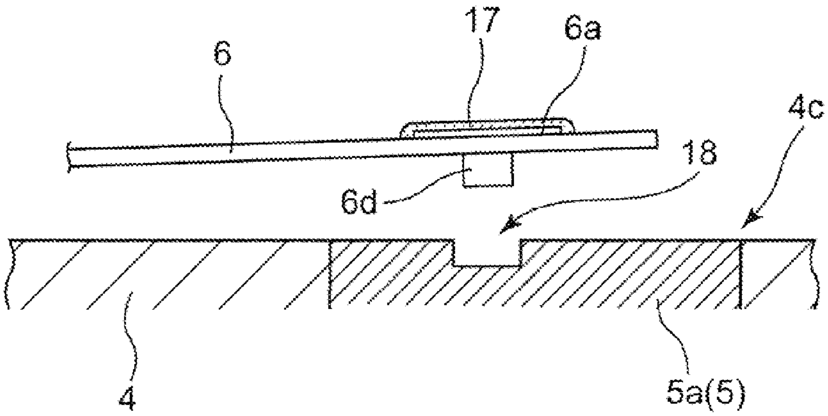
FIG. 9A is an enlarged cross-sectional view of an alternative receiving member.
Figure 9B:
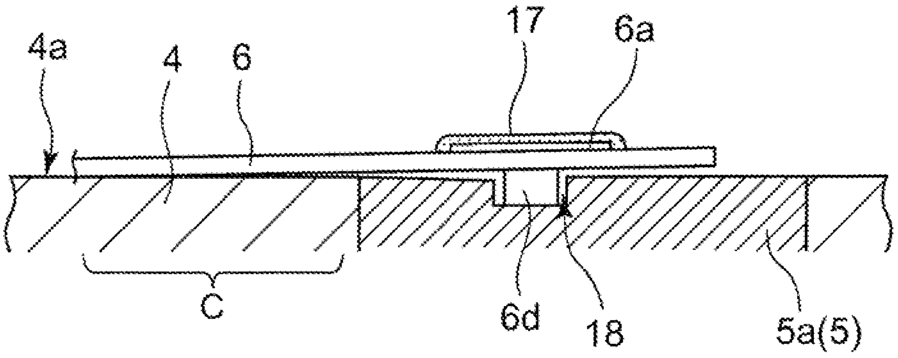
FIG. 9B is an enlarged cross-sectional view of a state where a rigid substrate is placed on the alternative receiving member.
Figure 9C:
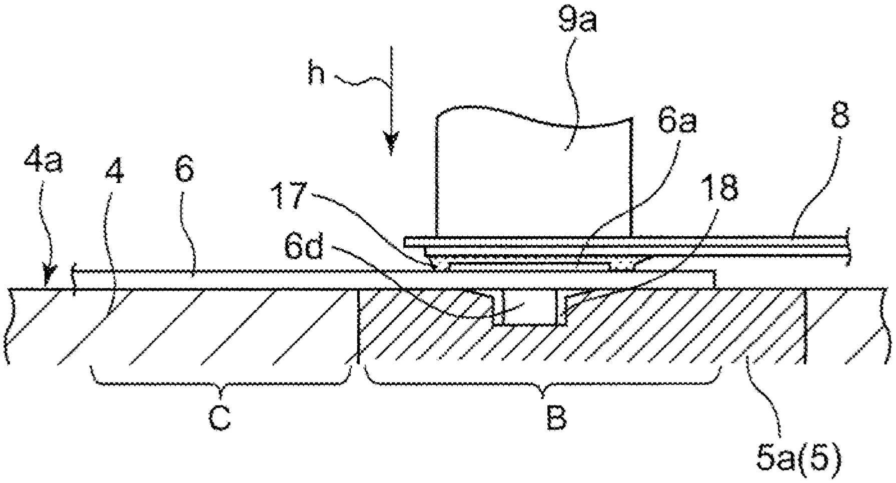
FIG. 9C is an enlarged cross-sectional view illustrating an operation of the alternative receiving member during thermocompression bonding.

FIGS. 9A to 9C illustrate an alternative of the receiving member 5. The receiving member 5 according to this alternative includes, as an uppermost layer, a resilient member 5*a* which is provided, in its upper surface, with a concave portion 18, at a position to be contacted with the chip component 6*d* on the lower surface of the rigid substrate 6.

As illustrated in FIG. 9A, when the rigid substrate 6 is placed on the backing plate 4, the rigid substrate 6 is positioned such that the chip component 6*d* on the lower surface thereof is positioned above the concave portion 18.

Next, as illustrated in FIG. 9B, the rigid substrate 6 is placed on the backing support surface 4*a*. Thus, the rigid substrate 6 is supported at its lower surface by the backing support surface 4*a* in the height reference portion C and, also, the chip component 6*d* is fitted in the concave portion 18. At this time, since the depth of the concave portion 18 is smaller than the height of the chip component 6*d* (the distance from the lower surface of the rigid substrate 6 to the lower end of the chip component 6*d*), the lower surface of the rigid substrate 6 does not come into contact with the upper surface of the resilient member 5*a*.

Thereafter, as illustrated in FIG. 9C, the compression bonding portion 9 is descended (an arrow h) to push, downwardly, the flexible substrate 8 through the compression bonding tool 9*a*, which brings the terminal formed on the lower surface of the flexible substrate 8 into contact with the connection terminal portion 6*a* with the conductive adhesive agent 17 interposed therebetween and, further, pushes the rigid substrate 6 downwardly. Thus, the rigid substrate 6 is entirely pressed against the backing support surface 4*a* and, then, the rigid substrate 6 is stopped from being pushed downwardly, in a state where the rigid substrate 6 is in close contact, at its lower surface, with the height reference portion C. Thus, the height thereof is restricted. In this state, in the compression bonding flat-surface portion B, the rigid substrate 6 is in close contact, at its lower surface, with the upper surface of the resilient member 5*a* and, also, the chip component 6*d* pushes downwardly the bottom surface of the concave portion 18 to sink the resilient member 5*a* in its entirety around the concave portion 18. Accordingly, a resilient force corresponding to the amount of sinking of the resilient member 5*a* acts on the chip component 6*d*, thereby providing an appropriate supporting counterforce for operations for thermocompressively bonding the rigid substrate 6 and the flexible substrate 8 to each other. Due to the provision of the concave portion 18 at the position coincident with that of the chip component 6*d*, it is possible to prevent the resilient member 5*a* from being sunk by an excessive amount at the portion of the chip component 6*d*, in comparison with portions of the rigid substrate 6 which surround the chip portion 6*d*.

As described above, in the substrate thermocompression-bonding device according to the present embodiment, the substrate backing device 3 for placing and holding the rigid substrate 6 and for receiving, from therebelow, the pressing force during thermocompression-bonding operations is adapted to include the base portion 12 provided with the horizontal flat surface 12*a* in its upper surface, and the plate-shaped backing plate 4 which is adapted to be contacted, at its lower surface, with the flat surface 12*a* of the base portion 12 and, further, is provided, in its upper surface, with the backing support surface 4*a* to be contacted with the lower surface of the rigid substrate 6 for supporting it, wherein the backing support surface 4*a* is provided with the opening portion 4*d* having a planar opening shape encompassing the compression bonding area of the rigid substrate 6 which is to be connected to the flexible substrate 8, and, further, within the opening portion 4*d*, there is provided the receiving member 5 which comes into contact with the lower surface of the rigid substrate 6 and the chip component 6*d* having been preliminarily mounted on this lower surface in the compression bonding area and applies, thereto, an upward supporting counterforce corresponding to the pressing force, during thermocompression bonding operations. Accordingly, it is possible to apply an appropriate supporting counterforce to the rigid substrate 6, without employing a compression bonding mechanism with a complicated structure for controlling, with higher accuracy, the compression bonding load during thermocompression bonding, which has been required in conventional techniques. This enables ensuring stabilized connection quality, with a lower equipment cost, without necessitating precise pressing-force control.

Second Embodiment

Figure 10:
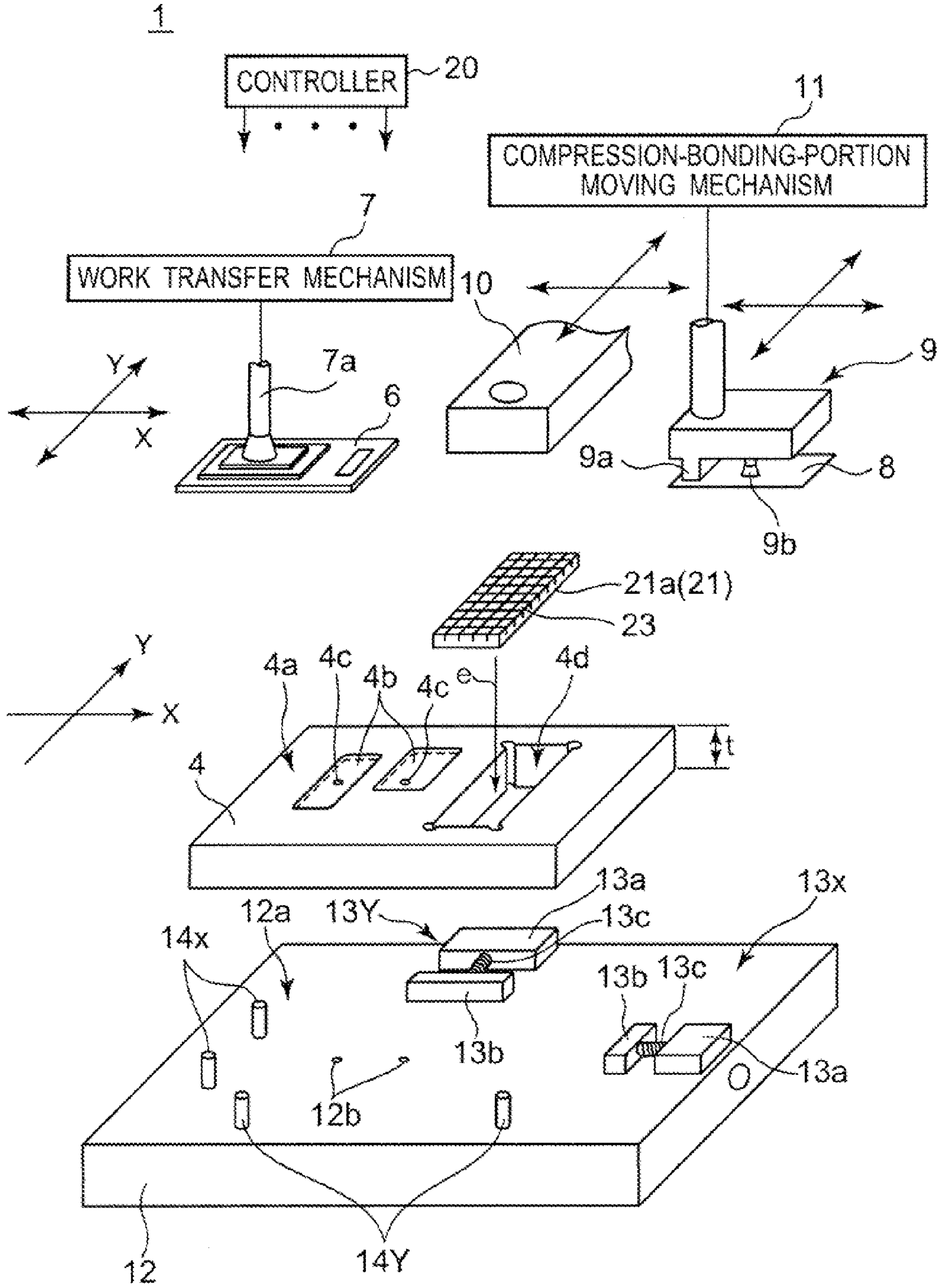
FIG. 10 is a perspective view of a substrate thermocompression-bonding device employing a substrate backing device according to a second embodiment of the present invention.
Figure 11:
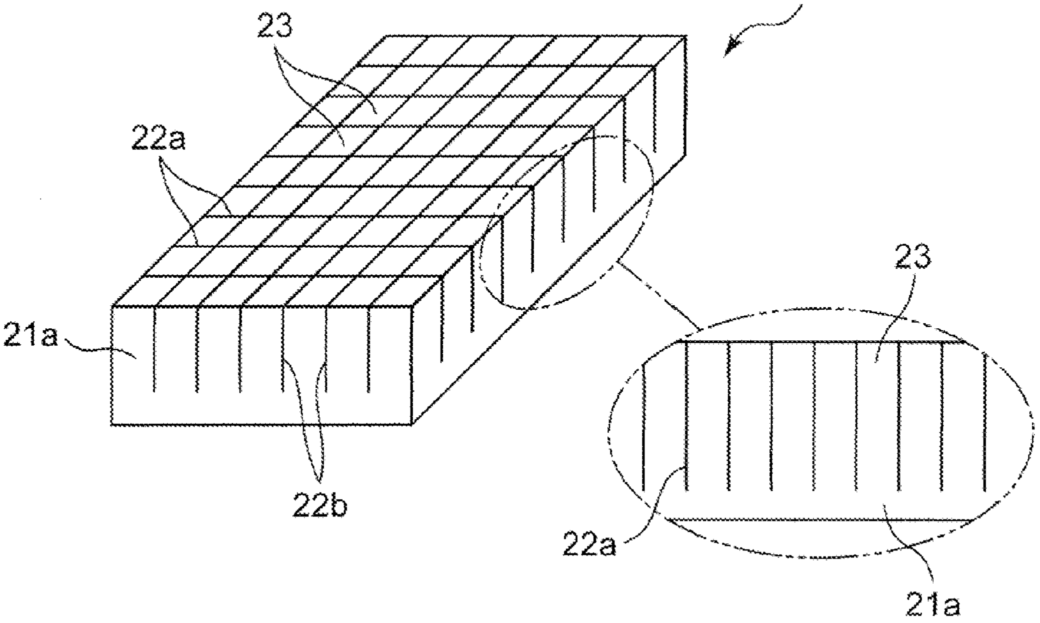
FIG. 11 is a perspective view illustrating a receiving member.

FIG. 10 illustrates a second embodiment which is different from the first embodiment, in terms of the structure of a receiving member 21. More specifically, as illustrated in FIG. 11, the receiving member 21 according to the present embodiment includes a single resilient member 21*a*. The resilient member 21*a* is made of a material having properties of being freely expanded and contracted by external forces, generating certain resilient forces according to the degree of its compression and further removing external forces therefrom to return to the original shape, such as elastomers such as resins or rubbers, sponges, felts. The resilient member 21*a* having a substantially-flat rectangular parallelepiped shape is provided with plural cutouts 22*a* and 22*b* extending from its upper surface toward its lower surface. More specifically, the cutouts 22*a* have a linear shape extending in the widthwise direction in the figure and are placed at even intervals. Further, the cutouts 22*b* have a linear shape extending in the depthwise direction in the figure and are placed at even intervals which are the same as those of the cutouts 22*a*. The cutouts 22*a* and 22*b* extend in respective directions orthogonal to each other, in a planar view. Accordingly, in a planar view, the cutouts 22*a* and 22*b* form a square-shaped grid in the upper surface of the resilient member 21*a*. The cutouts 22*a* and 22*b* are not necessarily required to be the same and, also, the cutouts 22*a* and 22*b* are not necessarily required to be orthogonal to each other. In these cases, in a planar view, the cutouts 22*a* and 22*b* form a grid with a rectangular shape different from a square shape, in the upper surface of the resilient member 21*a*.

The depth of the cutouts 22*a* and 22*b* is determined such that they do not reach the lower surface of the resilient member 21*a*. In the present embodiment, all the cutouts 22*a* and 22*b* are made to have the same depth, but the cutouts 22*a* and 22*b* can be made to have different depths according to conditions of the chip component 6*d* (see FIGS. 13A to 13C) to come into contact with the upper surface of the resilient member 21*a*, such as the number, the shape and the size thereof.

A area encircled by each two lateral cutouts 22*a* adjacent to each other and each two longitudinal cutouts 22*b* adjacent to each other forms an elongated prism-shaped block 23. In other words, the upper surface of the resilient member 21*a* is formed from a plurality of blocks 23 which are gathered densely.

Figure 12:
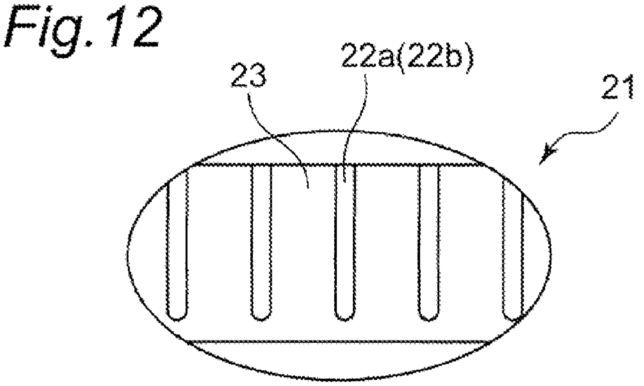
FIG. 12 is an enlarged cross-sectional view illustrating cutouts according to an alternative suggestion.

Each prism portion 23 is substantially isolated from the resilient member 21*a* through the cutouts 22*a* and 22*b* and, therefore, can deform substantially independently, in the thickwise direction of the resilient member 21*a*, particularly. In other words, the individual blocks 23 can be compressed and deformed substantially independently. In the present embodiment, the width of the cutouts 22*a* and 22*b* is set to be a minimum necessary width for isolating the resilient member 21. Namely, in an initial state where no external force acts thereon, the adjacent blocks 23 are in contact with each other at their side walls. However, as illustrated in FIG. 12, the cutouts 22*a* and 22*b* can be also made to have a certain width for providing a gap between adjacent blocks 23 in the initial state. Further, the blocks 23 are not necessarily required to have a prism shape as in the present embodiment. Provided that the upper-surface side of the resilient member 21*a* is formed from blocks capable of being compressed and deformed substantially independently, the individual blocks can have other shapes such as a triangular prism shape, a column shape and an elliptical column shape and, also, the individual blocks can have different sizes or shapes.

Figure 13A:
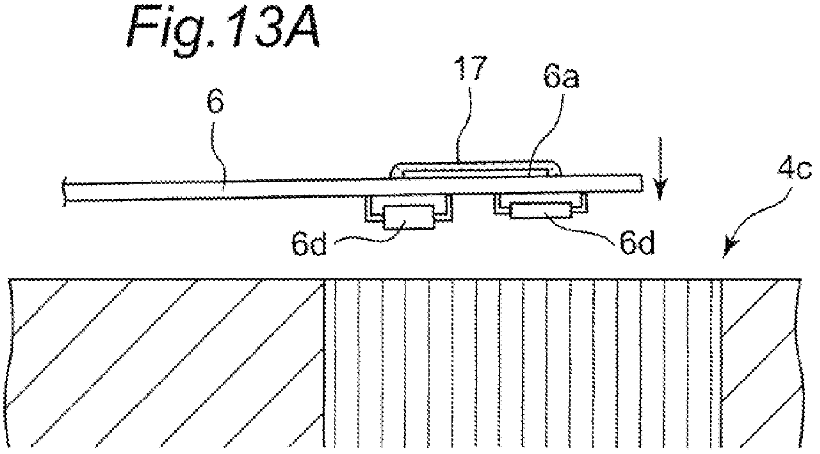
FIG. 13A is an enlarged cross-sectional view of the receiving member.
Figure 13B:
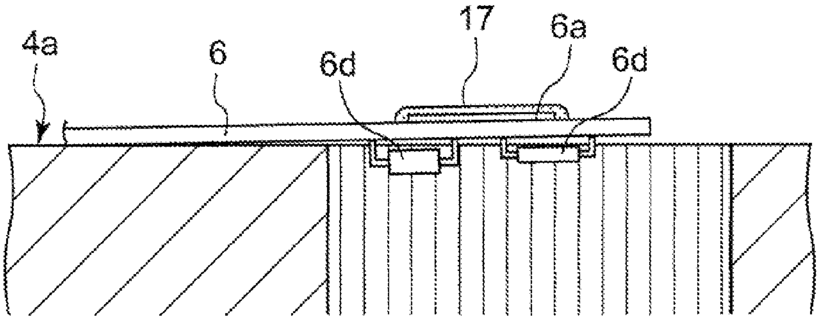
FIG. 13B is an enlarged cross-sectional view of a state where a rigid substrate is placed on the receiving member.

As illustrated in FIG. 13A, the rigid substrate 6 is descended toward the backing plate 4. As illustrated in FIG. 13B, in a state where the rigid substrate 6 is merely placed on the backing support surface 4*a* and, therefore, is subjected to no pressing force from thereabove, the lower surface of the rigid substrate 6 is not entirely in contact with the resilient member 5*a* in the compression bonding flat-surface portion B, and only the chip components 6*d* protruding downwardly from the lower surface of the rigid substrate 6 are in contact with the resilient member 5*a*. The blocks 23 being in contact with the chip components 6*d* are pushed downwardly by the chip components 6*d*, thereby partially sinking the upper surface of the resilient member 21*a*.

Figure 13C:
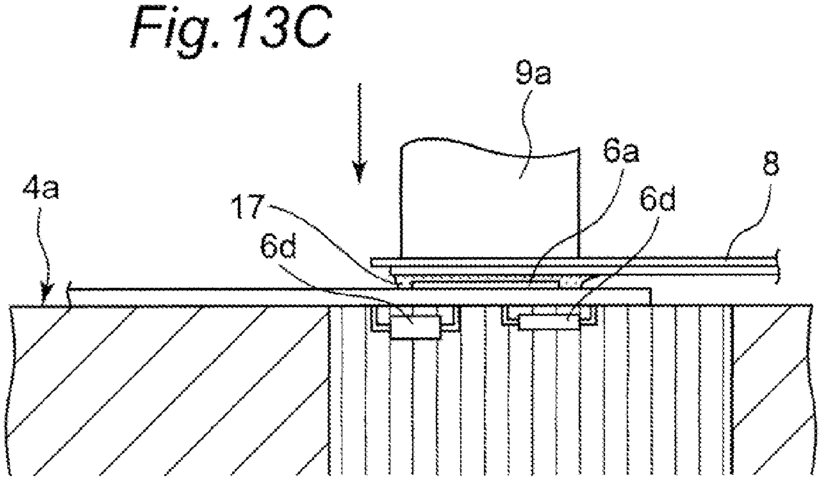
FIG. 13C is an enlarged cross-sectional view illustrating an operation of the receiving member during thermocompression bonding.

As illustrated in FIG. 13C, the compression bonding portion 9 holding the flexible substrate 8 is descended to push, downwardly, the flexible substrate 8 through the compression bonding tool 9*a*, thereby thermocompressively bonding the flexible substrate 8 to the connection terminal portion 6*a* through a conductive adhesive agent 17. During this compression bonding, in the compression bonding area encompassing the connection terminal portion 6*a*, the plural blocks 23 are individually pressed against the concavity and convexity formed by the lower surface of the rigid substrate 6 and the chip components 6*d* mounted on this lower surface, in such a way as to conform thereto, so that the plural blocks 23 are deformed thereby. Namely, the blocks 23 contacted with and pressed against the chip components 6*d* protruded from the lower surface of the rigid substrate 6 are deformed by relatively-larger amounts by being pressed thereagainst, while the blocks 23 contacted with and pressed against the lower surface of the rigid substrate 6 are deformed by relatively-smaller amounts by being pressed thereagainst. Thus, due to the provision of the blocks 23 defined by the cutouts 22*a* and 22*b*, it is possible to improve the followability of the resilient member 21*a* to the convexity and concavity formed by the lower surface of the rigid substrate 6 and the chip components 6*d* thereon, when it is pressed thereagainst to be deformed. As a result thereof, it is possible to improve the uniformity of the supporting counterforce which acts on the lower surface of the rigid substrate 6 and the chip components 6*d* thereon, thereby enabling supporting the rigid substrate 6 more properly, during thermocompression-bonding operations.

The other structures and operations of the second embodiment are the same as those of the first embodiment and, therefore, the same or similar components thereof will be designated by the same reference characters and will not be described herein.

Figure 14A:
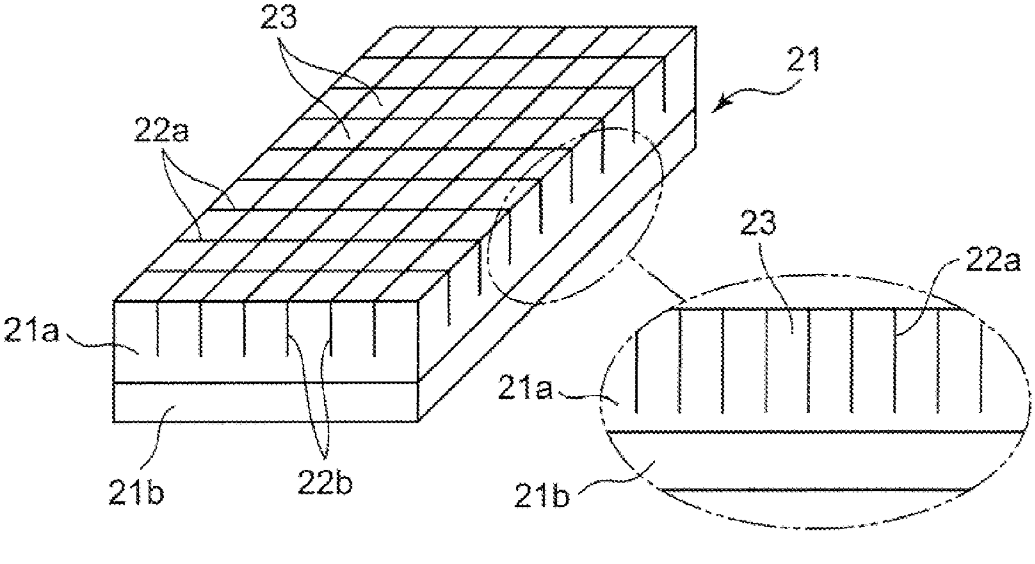
FIG. 14A is a perspective view illustrating a first alternative of the receiving member.
Figure 14B:
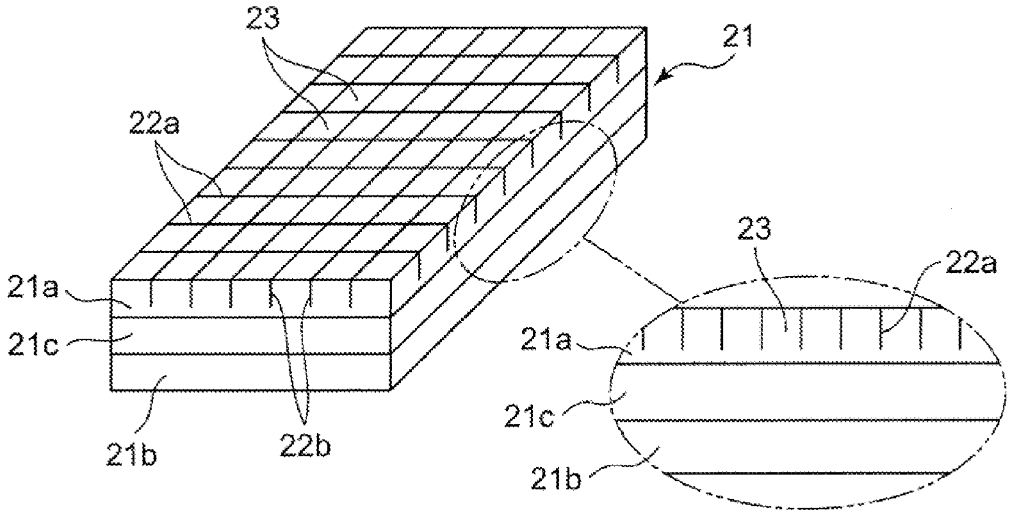
FIG. 14B is a perspective view illustrating a second alternative of the receiving member.
Figure 14C:
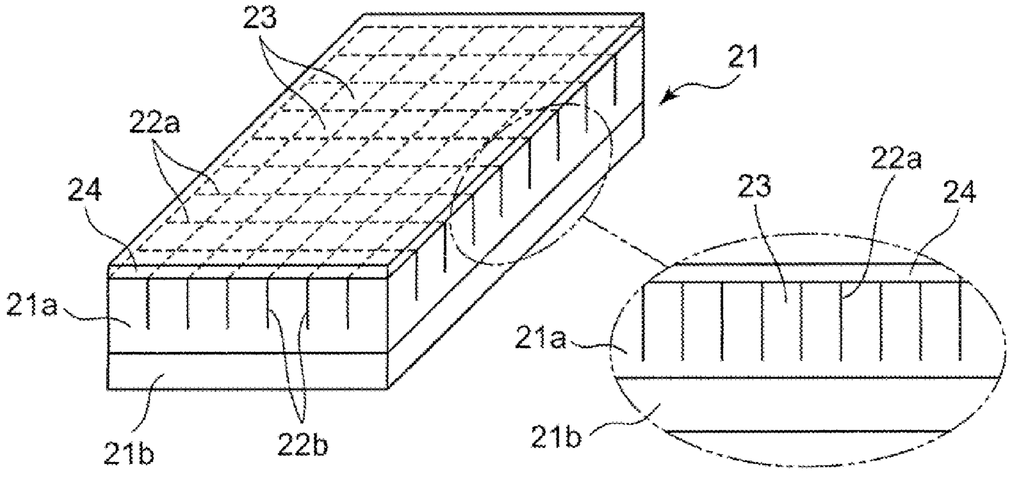
FIG. 14C is a perspective view illustrating a third alternative of the receiving member.

FIGS. 14A to 14C illustrate alternatives regarding the laminated-layer structure of the receiving member 21 according to the second embodiment. A receiving member 21 according to the alternative illustrated in FIG. 14A is structured to include a resilient member 21*a* provided with blocks 23 defined by cutouts 22*a* and 22*b*, and a thickness adjustment member 21*b* which is made of a relatively hard material and is placed under the resilient member 21*a*. A receiving member 21 according to the alternative illustrated in FIG. 14B is structured to include a resilient member 21*a* provided with blocks 23 defined by cutouts 22*a* and 22*b*, a resilient member 21*c* which is provided with no cutout and is placed under the resilient member 21*a*, and a thickness adjustment member 21*b* placed thereunder. A receiving member 21 according to the alternative illustrated in FIG. 14C is structured to include a resilient member 21*a* provided with blocks 23 defined by cutouts 22*a* and 22*b*, a thickness adjustment member 21*b* placed under the resilient member 21*a*, and a protective layer 24 having flexibility and stretchability which is overlaid on the upper surface of the resilient member 21*a*. Further, in cases where the resilient member 21*a* as the uppermost layer is provided with blocks 23 defined by cutouts 22*a* and 22*b* as in the second embodiment, it is also possible to provide a concave portion in the upper surface of the resilient member 21, at a position to be contacted with the chip component 6*d* on the lower surface of the rigid substrate 6, as illustrated by the reference character 18 in FIGS. 9A to 9C.

INDUSTRIAL APPLICABILITY

The substrate backing device and the substrate thermocompression-bonding device according to the present invention have an effect of ensuring stabilized connection quality, with a lower equipment cost, without necessitating precise pressing-force control and, therefore, are usable in the field of bonding of film-type flexible substrates to electrodes provided on rigid substrates in small-size portable electronic apparatuses and the like.

DESCRIPTION OF REFERENCE CHARACTERS

1 Thermocompression-bonding device
3 Substrate backing device
4 Backing plate
4*a* Backing support surface
4*b* Concave portion
4*c* Suction hole
4*d* Opening portion
5 Receiving member
5*a* Resilient member
5*b* Resilient member
5*c* Thickness adjustment member
6 Rigid substrate
6*a* Connection terminal portion
6*c* Already mounted component
8 Flexible substrate
9 Compression bonding portion
10 Imaging unit
12 Base portion
13X and 13Y Clamping mechanism
14X and 14Y Positioning pin
17 Conductive adhesive agent
20 Controller
21 Receiving member
21*a* Resilient member
21*b* Thickness adjustment member
21*c* Resilient member
22*a* and 22*b* Cutout
23 Block
24 Protective layer

The invention claimed is:

1. A substrate backing device for placing and holding a first substrate and for receiving, from therebelow, a pressing force during thermocompressively bonding a second substrate to the first substrate, the substrate backing device comprising:

a base portion having an upper surface and a horizontal flat surface in the upper surface;

a backing plate having a lower surface and an upper surface parallel with the lower surface, and being adapted to be contacted, at the lower surface of the backing plate, with the horizontal flat surface of the base portion, and having, in the upper surface of the backing plate, a backing support surface adapted to come into contact with a lower surface of the first substrate for supporting the first substrate;

wherein the backing plate is rigid;

wherein the backing support surface includes a holding flat-surface portion adapted to hold the lower surface of the first substrate placed on the backing plate, an opening portion which is shaped and positioned to encompass a compression bonding area of the first substrate placed on the opening portion which is to be compressively bonded to the second substrate, and a height reference portion which is provided adjacent to the opening portion and is adapted to restrict the first substrate in terms of a heightwise position of the first substrate;

wherein the backing support surface is provided with a receiving member which is placed within the opening portion and is adapted to, during the thermocompression bonding, come into contact with the lower surface of the first substrate and with a component having been preliminarily mounted on the lower surface of the first substrate in an area coincident with the compression bonding area and, further, apply an upward supporting counterforce corresponding to the pressing force; and wherein the receiving member includes a resilient member which is adapted to exert an upward resilient force, which is induced when being pushed downwardly by the lower surface of the first substrate and the component which are in contact with an upper surface of the resilient member, as a supporting counterforce on the first substrate and on the component.

2. The substrate backing device according to claim 1, wherein the resilient member includes a plurality of blocks which are defined by a cutout extending from the upper surface of the resilient member and can be pushed individually.

3. The substrate backing device according to claim 2, wherein the cutout includes a plurality of first cutouts placed such that they are spaced apart from each other and extend in a linear shape in a first direction in a planar view, and a plurality of second cutouts placed such that they are spaced apart from each other and extend in a linear shape in a direction intersecting with the first direction in a planar view, and the blocks have a column shape defined by the first and second cutouts.

4. The substrate backing device according to claim 1, wherein the resilient member comprises a combination of plural members made of materials having different resilient characteristics.

5. The substrate backing device according to claim 1, wherein the holding flat-surface portion is provided with a concave portion for preventing interference with the component having been already mounted on the lower surface of the first substrate.

6. The substrate backing device according to claim 5, further comprising a vacuum suction hole which is opened through a wall surface of the concave portion, and an evacuation system which is adapted to evacuate an inside of the concave portion through the vacuum suction hole for holding, through vacuum suction, the lower surface of the first substrate on the holding flat-surface portion.

7. The substrate backing device according to claim 1, wherein the first substrate comprises a substrate having flexibility, and the second substrate comprises a substrate having rigidity.

8. A substrate backing device for placing and holding a first substrate and for receiving, from therebelow, a pressing force during thermocompressively bonding a second substrate to the first substrate, the substrate backing device comprising:

a base portion having an upper surface and a horizontal flat surface in the upper surface; and a backing plate having a lower surface and an upper surface parallel with the lower surface, and being adapted to be contacted, at the lower surface of the backing plate, with the horizontal flat surface of the base portion, and having, in the upper surface of the backing plate, a backing support surface adapted to come into contact with a lower surface of the first substrate for supporting the first substrate;

wherein the backing support surface includes a holding flat-surface portion adapted to hold the lower surface of the first substrate placed on the backing plate, an opening portion which is shaped and positioned to encompass a compression bonding area of the first substrate placed on the opening portion which is to be compressively bonded to the second substrate, and a height reference portion which is provided adjacent to the opening portion and is adapted to restrict the first substrate in terms of a heightwise position of the first substrate, wherein the backing support surface is provided with a receiving member which is placed within the opening portion and is adapted to, during the thermocompression bonding, come into contact with the lower surface of the first substrate and with a component having been preliminarily mounted on the lower surface of the first substrate in an area coincident with the compression bonding area and, further, apply an upward supporting counterforce corresponding to the pressing force, and wherein the receiving member includes a resilient member which is adapted to exert an upward resilient force, which is induced when being pushed downwardly by the lower surface of the first substrate and the component which are in contact with an upper surface of the resilient member, as a supporting counterforce on the first substrate and on the component, and wherein the receiving member further includes a thickness adjustment member which is placed under the resilient member for adjusting a thickness of the entire receiving member.

9. A substrate backing device for placing and holding a first substrate and for receiving, from therebelow, a pressing force during thermocompressively bonding a second substrate to the first substrate, the substrate backing device comprising:

a base portion having an upper surface and a horizontal flat surface in the upper surface; and a backing plate having a lower surface and an upper surface parallel with the lower surface, and being adapted to be contacted, at the lower surface of the backing plate, with the horizontal flat surface of the base portion, and having, in the upper surface of the backing plate, a backing support surface adapted to come into contact with a lower surface of the first substrate for supporting the first substrate;

wherein the backing support surface includes a holding flat-surface portion adapted to hold the lower surface of the first substrate placed on the backing plate, an opening portion which is shaped and positioned to encompass a compression bonding area of the first substrate placed on the opening portion which is to be compressively bonded to the second substrate, and a height reference portion which is provided adjacent to the opening portion and is adapted to restrict the first substrate in terms of a heightwise position of the first substrate, wherein the backing support surface is provided with a receiving member which is placed within the opening portion and is adapted to, during the thermocompression bonding, come into contact with the lower surface of the first substrate and with a component having been preliminarily mounted on the lower surface of the first substrate in an area coincident with the compression bonding area and, further, apply an upward supporting counterforce corresponding to the pressing force, and wherein the opening portion has a cutout portion which communicates with an outside through a side surface of the backing plate at least in a single direction in a planar view, and this cutout portion is adapted to allow the receiving member to be attached and detached in a horizontal direction therethrough.

10. A substrate thermocompression-bonding device for pressing a second substrate to a first substrate for thermocompressively bonding them, the substrate thermocompression-bonding device comprising:

the substrate backing device according to claim 1;

a work transfer mechanism adapted to hold the second substrate and transfer it to the first substrate being held by the substrate backing device;

a compression bonding portion adapted to press the transferred second substrate against the first substrate for thermocompressively bonding them; and a relative movement mechanism adapted to move the compression bonding portion with respect to the substrate backing portion.

* * * * *